United States Patent
Jaquet-Chiffelle

(10) Patent No.: US 8,868,918 B2
(45) Date of Patent: Oct. 21, 2014

(54) AUTHENTICATION METHOD

(75) Inventor: David-Olivier Jaquet-Chiffelle, Neuchâtel (CH)

(73) Assignee: Haute Ecole Specialisee Bernoise, Bienne (CH)

(*) Notice: Subject to any disclaimer, the term of this patent is extended or adjusted under 35 U.S.C. 154(b) by 0 days.

(21) Appl. No.: 13/289,591

(22) Filed: Nov. 4, 2011

(65) Prior Publication Data

US 2012/0272067 A1    Oct. 25, 2012

Related U.S. Application Data

(63) Continuation of application No. PCT/EP2010/055248, filed on Apr. 21, 2010.

(30) Foreign Application Priority Data

May 7, 2009 (CH) ........................................ 0711/09

(51) Int. Cl.
*G06F 21/00* (2013.01)
*G06Q 10/00* (2012.01)
*H04L 29/06* (2006.01)
*G06F 21/34* (2013.01)
*H04L 9/32* (2006.01)

(52) U.S. Cl.
CPC ........ *G06Q 10/00* (2013.01); *G06F 2221/2103* (2013.01); *H04L 63/0838* (2013.01); *G06F 21/34* (2013.01); *H04L 9/3271* (2013.01)
USPC ........... 713/182; 713/168; 713/170; 713/183; 713/184

(58) Field of Classification Search
CPC ... H04L 63/0428; H04L 63/08; H04L 9/3226; H04L 63/083; G06F 21/31
USPC ........................... 713/168, 170, 182, 183, 184
See application file for complete search history.

(56) References Cited

U.S. PATENT DOCUMENTS 5,668,876 A * 9/1997 Falk et al. ............... 380/271
7,194,765 B2 * 3/2007 Blom .......................  726/12
7,631,186 B2 * 12/2009 Okabe ..................... 713/168
(Continued)

FOREIGN PATENT DOCUMENTS

EP      1862948     5/2007
GB      2434663     1/2007

OTHER PUBLICATIONS

RSA SecurID® Authenticators : the gold standard in two-factor user authentication, www.sas-uk.net/pdfs/rsaecurity/sid_ds_0205.pdf, (c) 2004-2005, 2 pages.

*Primary Examiner* — Michael Chao
*Assistant Examiner* — Shiuh-Huei Ku
(74) *Attorney, Agent, or Firm* — Blank Rome LLP

(57) ABSTRACT

Method enabling a user to verify the operation of a personal cryptographic device, comprising the following steps: a) a user (2) enters an access request in a terminal (3) (100), d) a personal cryptographic device (1) of the user (2) calculates and displays a response (105), g) the user (2) verifies the operation of the personal cryptographic device (1) by requesting the terminal (3) to display the expected response to the challenge (110), i) the terminal (3) displays the expected response to the challenge (113), j) the user (2) compares the response displayed by the personal cryptographic device with the response displayed by the terminal.

9 Claims, 4 Drawing Sheets

(56) References Cited

U.S. PATENT DOCUMENTS

| | | |
|---|---|---|
| 8,195,940 B2 * | 6/2012 | Lioy et al. .................... 713/169 |
| 8,296,823 B2 * | 10/2012 | Schubert ........................ 726/3 |
| 2003/0233546 A1 | 12/2003 | Blom |
| 2005/0033995 A1 | 2/2005 | Lin et al. |
| 2008/0034216 A1 | 2/2008 | Law |
| 2008/0168544 A1 | 7/2008 | Von Krogh |
| 2008/0235778 A1 * | 9/2008 | Fratti et al. ...................... 726/8 |
| 2010/0017602 A1 * | 1/2010 | Bussard et al. ............... 713/168 |
| 2010/0071033 A1 * | 3/2010 | Umezawa et al. ................ 726/3 |

\* cited by examiner

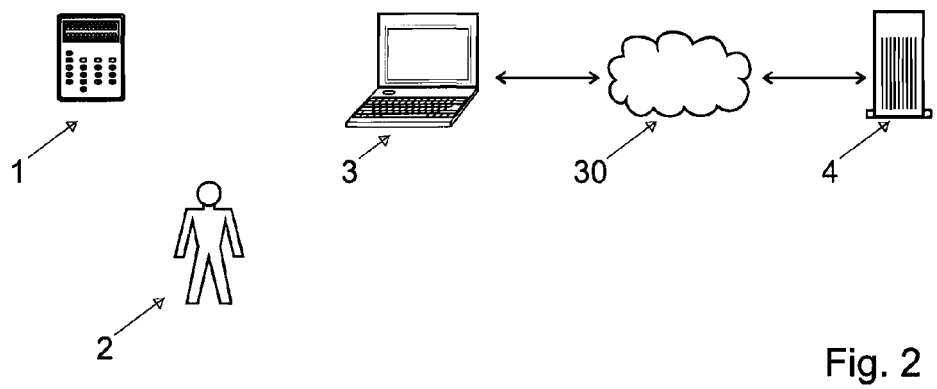
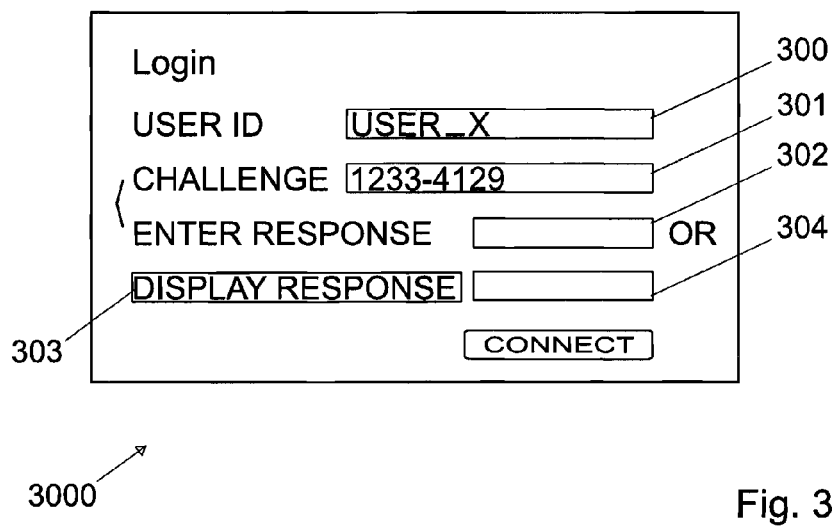
Fig. 2
Fig. 3

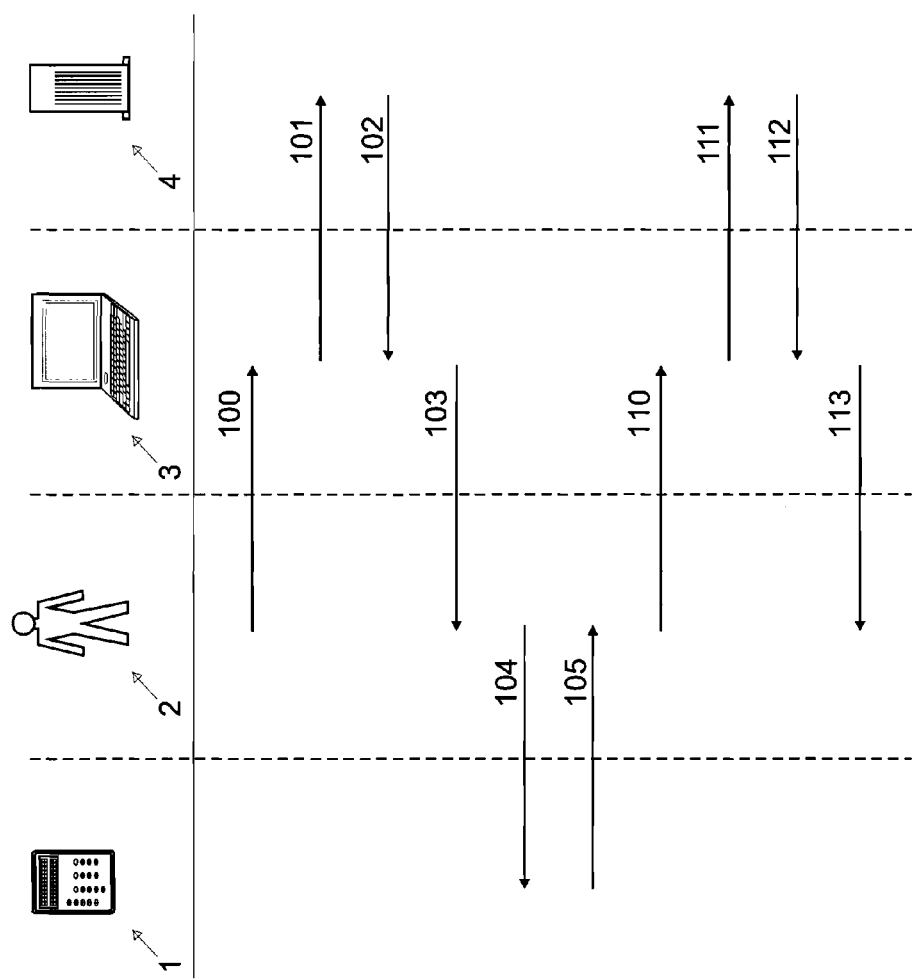

AUTHENTICATION METHOD

This application is a continuation of PCT/EP2010/055248, filed Apr. 21, 2010, which claims priority to CH0711/09, filed May 7, 2009, the entire contents of which are hereby incorporated by reference.

TECHNICAL FIELD

The present invention relates to a method for authenticating a user by means of a personal cryptographic device.

STATE OF THE ART

User authentication methods based on proof of ownership of a device, for example a key, chip-card or personal cryptographic device, are known in the prior art. Only a user having this device is authenticated and can access resources or a protected zone.

In one embodiment, the device is constituted by a personal cryptographic device (security token) that is capable of calculating and displaying a response to a challenge. The response to the challenge is either calculated by means of a confidential algorithm or based on a confidential key memorized in the device. The confidential elements cannot be determined from the pairs of challenges and responses entered and displayed, nor by opening the device. The device is thus practically impossible to falsify or to duplicate.

An example of personal cryptographic device is illustrated diagrammatically by way of example in FIG. 1. It includes a challenge input system, for example a keyboard 10, or any other data input device enabling a challenge to be entered into the device, a data display system, for example a screen 11, a loudspeaker etc. for displaying the response to this challenge, and a cryptographic processor (not represented) for calculating this response. Such devices are for example often used for authenticating users that wish to access a telebanking server or other protected services or zones.

In one example of application, the challenge is generated for example in an authentication and authorization server and transmitted through a communication network to a user terminal that displays it, for example on a web page. The user reads this challenge and enters it himself/herself into his/her personal cryptographic device received from the server operator. The cryptographic device calculates a response to this challenge and displays it to the user, who enters it manually onto the terminal's keyboard. The response is then transmitted to the server through the communications network and the server then provides access to the requested data or services when the response received corresponds to the response expected.

The user authentication is based on proof of possession of the personal cryptographic device; a user who does not have this device is incapable of determining the response expected to the challenge. As this device can be stolen or used by a non-authorized user, an additional local authentication means is frequently used to protect it. For example, many devices ask the user to enter a password or another proof of knowledge in possession of the user. Other devices use biometric verification, for example a fingerprint reading system, to authenticate the authorized user and lock the system for all other users.

Personal cryptographic devices frequently provide additional functions, for example the option of storing other personal information of the user, including passwords etc. There are also cryptographic devices designed to be used by several users in a same family or for authenticating the user vis-à-vis several different systems, for example by means of several different keys. As mentioned above, the cryptographic device is generally made available to the user by the operator of the authentication and authorization server. This operator must indeed know a decryption key, or an algorithm that makes it possible to verify whether the response to the challenge supplied by the device and entered by the user is correct. Since the device can contain personal user data (for example password, biometric data, data relative to other applications etc.), there is a risk that a device that has been tampered with hides these data in the response displayed to the challenge.

For example, a personal cryptographic device could perfectly modify some bits of the displayed response in order to transmit in encoded form information destined to the server. As the user completely ignores the response expected to the challenge, this modification can occur without the user's knowledge. The operator of a server can thus obtain confidential information stored on the user's cryptographic device without the user suspecting that the data he/she introduces himself/herself into a terminal constitute a security breach.

Although the quantity of data that can transit through this channel is limited, it is however perfectly possible to transmit sensitive and significant data by modifying one or several bits during several successive responses. This risk is at any rate sufficient to discourage certain users from using personal cryptographic devices for some sensitive applications.

EP1862948 relates to an IC card (for example a SIM card) comprising an OTP (One Time Password) application and which communicates with a device, for example a portable telephone, in order to display the OTP generated by the IC card. The IC card includes a client OTP and an interface for communicating with a mobile telephone. The telephone can connect to a communication network if it has successfully been authenticated through a "communication network key set" stored in a second IC card. This second card also includes an interface for communicating with the telephone. The two interfaces are compatible. However, using the two cards presents problems when the user does not have a device that allows him/her to insert the two cards simultaneously.

The application also describes an authentication process with a bank server, wherein
- an "OTP-SIM applet" in the card produces the OTP and displays it on the device's display,
- the user enters the OTP into a web window generated by a website of the web server that requested the authentication,
- the authentication data, including the OTP, are sent to the bank's web server,
- the OTP server verifies the authentication data with an HSM ("Hardware Security Module").

This document does not contain means or a method that makes it possible to verify whether the response displayed by the devices has not been falsified, for example with the aim of dissimulating information. There is no possibility of ensuring that the code displayed by the device has not been modified in order to discretely transmit confidential information or for another purpose.

The document extracted from the Internet site www.sas-uk.net/pdfs/rsaecurity/sid_ds_0205.pdf describes a device "RSA SecurID Authenticator" that operates like an ATM card and that, when used with an "RSA Authentication Manager", enables a user to identify with two factors, i.e. something he/she knows and something he/she possesses. Each user has an "RSA SecurID Authenticator" that generates a "one-time-use code". The user enters this code into the device with a PIN code. Once again, this document does not include means or a method that enables the user to verify, if he/she so wishes, whether the response displayed by the devices has not been falsified, for example with the aim of dissimulating information. Similarly, there is no possibility of ensuring that the code displayed by the device has not been modified in order to discretely transmit confidential information or for another purpose.

BRIEF SUMMARY OF THE INVENTION

One aim of the present invention is thus to propose an authentication method based on the proof of ownership of an object that is free from the limitations and risks mentioned above.

According to the invention, this aim is achieved notably by means of a method enabling a user to verify the operation of a personal cryptographic device, comprising the following steps:

a user enters an access request in a terminal, a personal cryptographic device of the user calculates and displays a response, instead of being authenticated by transmitting said response (for example at the terminal), the user verifies, when he/she so wishes, the operation of the personal cryptographic device by requesting the terminal to display the expected response to the challenge, the terminal displays the expected response to the challenge, the user compares the response displayed by the personal cryptographic device with the response displayed by the terminal.

This solutions has notably the advantage over the prior art of enabling the user to verify, when he/she so desires, whether the response displayed by his/her personal cryptographic device corresponds to the response expected by the server and whether it has not been falsified, for example with the aim of dissimulating information.

As the personal cryptographic device does not know whether and when the user might request this verification, it cannot modify with impunity the response it displays in response to a challenge, as the user always has the possibility of verifying this response and thus of discovering any tampering.

The terminal and the server of course ignore the information that the cryptographic devices is trying to transmit and can thus not simulate this response and display it instead of the correct response to the challenge.

This method thus allows a user to periodically verify whether the response supplied by his/her cryptographic device corresponds to what the server expects and thus to unmask with a very high probability those devices that voluntarily or involuntarily supply another response.

The security is increased even if the user only rarely or even never verifies the response displayed by a cryptographic device; it is sufficient that the possibility of verification exists to dissuade manufacturers or distributers of cryptographic devices from any tampering attempt.

BRIEF DESCRIPTION OF THE FIGURES

Examples of embodiments of the invention are indicated in the description illustrated by the attached figures, in which:

FIG. 2 illustrates diagrammatically a system implementing the inventive method.

FIG. 3 illustrates an example of dialogue box displayed by a software executing the inventive method.

FIG. 5 illustrates diagrammatically different data flows during the verification process of the personal cryptographic device according to the inventive method.

EXAMPLE(S) OF EMBODIMENTS OF THE INVENTION

Figure 1:
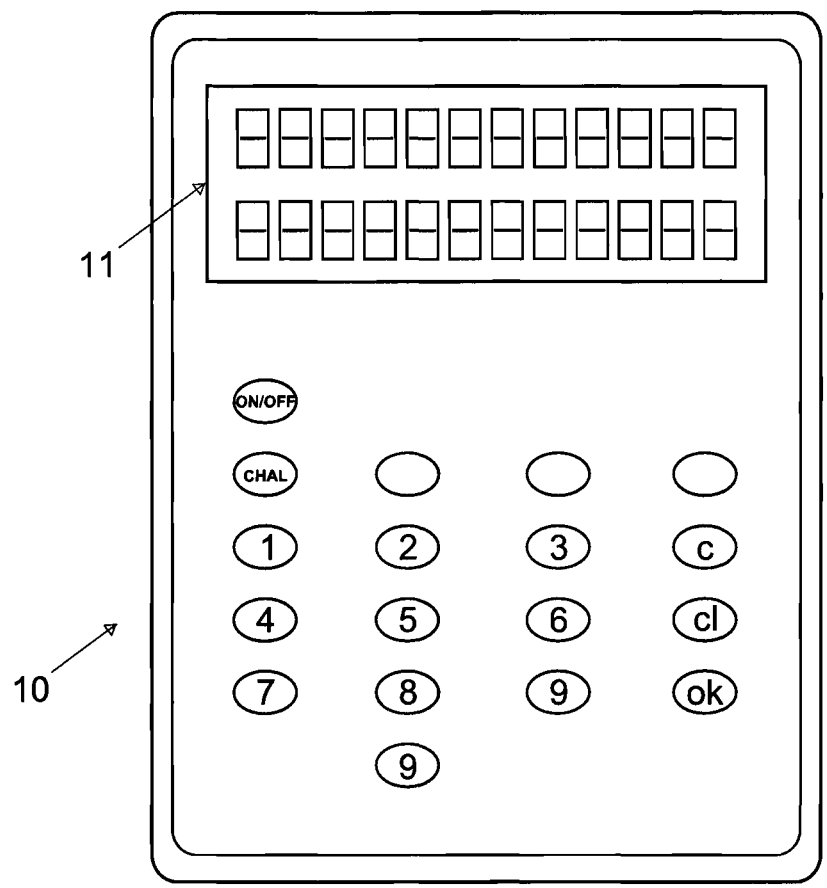
FIG. 1, already described, illustrates diagrammatically a personal cryptographic device that can be used in the method of the invention.

FIG. 1 illustrates an example of personal cryptographic device 1 according to the invention. It includes a keyboard 10 making it possible to switch the device on and off, to choose the operating mode and to enter a challenge. A screen 11 makes it possible to display instructions and the response to a challenge calculated by a cryptographic processor (not illustrated), for example a processor integrated into the device 1 or in a chip card inserted in a removable fashion into this device. The cryptographic processor calculates a response to the challenge by means of a mathematical formula that depends on a secret key stored in the device and/or by means of an individual secret algorithm specific to each device.

A challenge can also be entered into the personal cryptographic device by any data input means other than a keyboard; for example, a challenge can also be entered by means of a microphone, of a camera, of a bar-code reader etc.

In one embodiment, the response displayed by the device 1 also depends on the current time; the response to a same challenge will thus not always be the same but will depend on an internal clock that needs to be at least approximately synchronized with a clock of an authentication and authorization server.

It is also possible to use this internal clock, or another unique value known to both the device 1 and to a remote server, as a challenge. For example, the cryptographic device 1 and the server can agree about a list of one-way codes. In this case, the personal cryptographic device 1 can do without a keyboard 10 and entering a challenge is reduced to switching the device on in order for it to display a response depending only on the current time or another one-way value.

The personal cryptographic device 1 can furthermore be used for different functions. For example, it can be programmed to verify whether a password requested from the user is correct and provide access to the device or to certain applications of the device only if a correct password is entered. In another embodiment, the device 1 further allows biometric parameters of the user to be verified, for example his/her fingerprints, before use. It is also possible to store other data depending on the user in the personal cryptographic device, for example access data relating to other applications, passwords, account or credit card numbers, names or data of the user, access codes etc.

FIG. 2 illustrates diagrammatically an example of system in which the inventive method can be implemented. In this example, an authentication and authorization server 4 verifies the identity of a user and decides whether this user must be authorized to access protected resources, for example protected data or applications available to one or several users 2. The users 2 access these resources by means of a terminal 3, for example a computer, a mobile telephone, a PDA etc., connected to the server 4 through a telecommunication network 30, for example a packet-based network of the Internet or intranet type. The server 4 can for example be a web server, a VPN access controller, an application or any other server enabling access to protected resources to be controlled.

At least certain users furthermore have a personal cryptographic device 1, or token, capable of supplying responses granting access to the resources protected by the server 4. This cryptographic device 1 is typically made available to the users by the operator of the authentication and authorization server 4 or by a protected application on this server. The server 4 grants access to the protected resources only to the users 2 of terminals 3 capable of supplying the expected responses.

The inventive method can also be implemented in physical access control systems, for example systems controlling access to protected zones.

Figure 4:
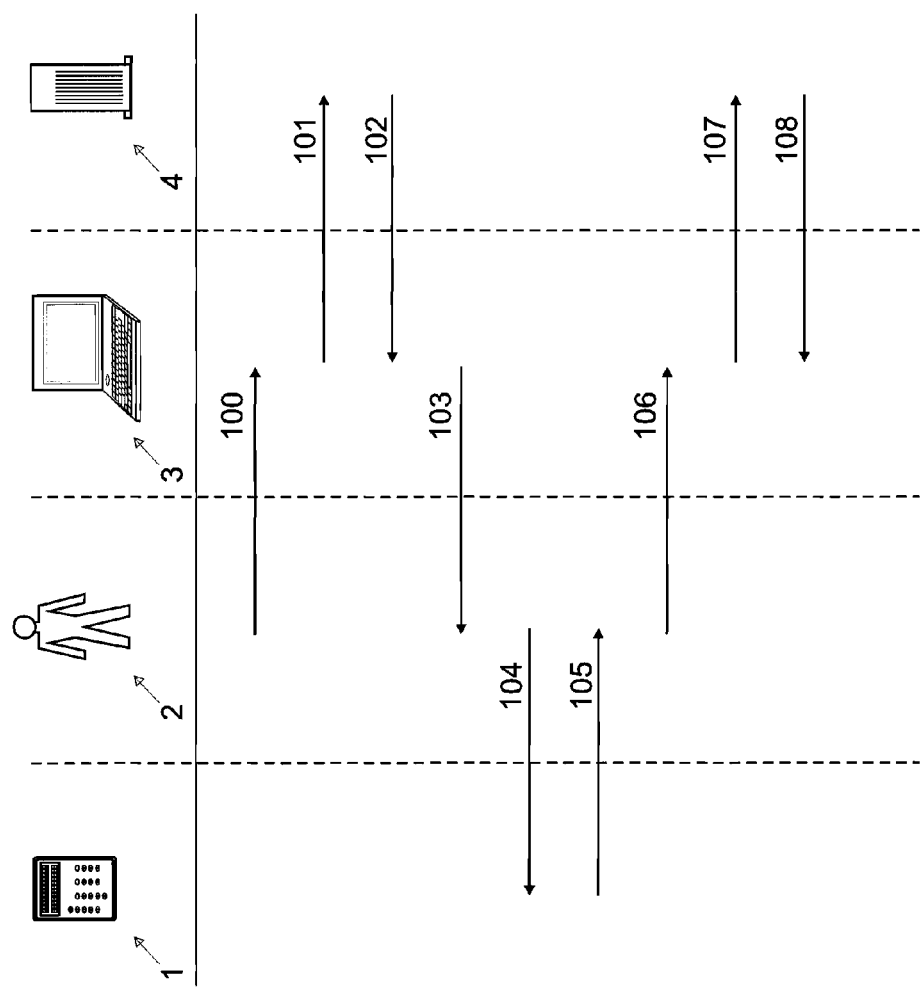
FIG. 4 illustrates diagrammatically different data flows during the authentication process according to the inventive method.

The data flux during the authentication and authorization process is illustrated by way of example in FIG. 4. During the step 100, the user 2 enters in his/her terminal a request to access protected resources. This request can be entered for example by typing or selecting a URL in a browser or by any appropriate command in a graphical user interface or through a voice server. During the step 101, the access request is then transmitted over a communication network 30 to an authentication and authorization server 4 responsible for authenticating and authorizing the users wishing to access protected resources.

In another embodiment, access control is performed by an appropriate application directly in the terminal 3, without any request being transmitted to a remote server.

The authentication and authorization server 4 responds to this access request by sending a challenge (step 102) to the terminal 3. This challenge can be transmitted through the communication network already used for transmitting the access request or through a different network.

The challenge (or the response expected to a given challenge) can depend on a previously performed user identification, for example by asking the user to enter the user ID or by verifying the user's electronic address (for example IP address, Mac address, caller number CLI, etc.). The transmission of the challenge can be encrypted and/or signed electronically.

The challenge received by the terminal is displayed or reproduced to the user 2 during the step 103. In one embodiment, the challenged is displayed in a web window or in a dialogue box 3000 such as the one illustrated by way of example in FIG. 3; in this example, the challenge 1233-4129 is displayed in a zone 301 to the user "USER_X" (zone 300), and the dialogue box enables the user to enter a response to this challenge into the data input field 302.

The challenge can also be implicit and correspond for example to the current time or to a sequence of numbers or of one-way codes known both to the device 1 and to the server 4.

In order to be authenticated, the user 2 enters during the step 104 this challenge in his/her personal cryptographic device 1 by using the input means, for example by typing this challenge on the device's keyboard.

The challenge can also be transmitted directly from the terminal to the cryptographic device, for example through an acoustic pairing involving a loudspeaker in the terminal and a microphone in the cryptographic device 1 or by means of an optical pairing implementing an image sensor on the device 1 to capture a fixed or animated image, a barcode or a watermark displayed by the terminal. Other challenge input means from the terminal to the device can be conceived. The transmission of the challenge from the cryptographic device does not necessarily go through the user. On the other hand, the transmission of the response from the device involves the user.

The cryptographic device 1 responds to the terminal during step 105 by displaying or reproducing the response to this challenge calculated by the cryptographic processor. As mentioned above, the displaying of the response can depend on a password or on biometric parameters enabling access to the cryptographic device 1 to be blocked to all users other than the authorized user 2.

The user enters during step 106 this response into the field 302 of the dialogue box displayed on his terminal or enters this response in another manner. The response is then transmitted to the server 4 during step 107, for example when the user selects the button "connect" on the graphical interface. Again, this transmission can be encrypted and/or signed electronically. It can occur via the transmission channel used previously for transmitting the access request and/or the challenge or over another communication network.

The server 4 then verifies during step 107 whether the response received is indeed the expected response, for example by comparison with the expected response, or by means of another cryptographic operation. If the response is correct, the requested data or other resources are transmitted during step 108 to the terminal 3 that displays them to the user 2.

As mentioned above, the user 2 has no possibility in the prior art to ensure that the code displayed by the cryptographic device 1 during step 105 corresponds only to the expected response to the challenge and that this code has not been modified to discretely transmit confidential information or for another purpose. A fraudulent operator could thus distribute to the users cryptographic devices tampered with so as to modify one or several bits of the displayed responses depending on the user's password or other confidential data. This modification must of course be performed so as to allow nevertheless a verification of the entered response and requires that this response should include redundant information or at any rate that several responses to a same challenge be accepted.

In order to limit this risk and make tampering detectable, the inventive method allows the user to verify whether the responses supplied to the challenges by the personal cryptographic device 1 correspond to the expected responses and if they have not been tampered with. To this effect, the method allows the user to request from the access server 4 that it supplies the expected response to the challenge or at any rate information allowing this response to be verified. In the dialogue box displayed by way of example in FIG. 3, the user can select the button 303 (or perform another operation) to ask the server 4 to display in zone 304 the expected response. This operation interrupts the authentication process and the user therefore does not need to enter any response in the field 302.

FIG. 5 illustrates by way of example a data flow during the verification process. Steps 100 to 105 are identical to corresponding steps described in relation to FIG. 4. During step 110, the user 2 however does not supply to the authentication and authorization server 4 the response that the personal cryptographic device 1 has just supplied to him/her; instead of this, the user enters in his/her terminal 3 a request to display the response to the challenge, for example by clicking the button 303 on its graphical interface.

This request is transmitted during step 111 to the server 4, which answers thereto during step 112 by transmitting the expected response, or information sufficient for the response to be verified. This information is then displayed to the user during step 113. The user 2 can then use this response, for example the response to the challenge expected by the authentication and authorization server 4, to verify whether it corresponds to the response given by the cryptographic device 1 and whether the latter has not been tampered with.

If the response displayed by the device 1 is correct, and if the user wishes to be authenticated and connected to the server 4, the user must start the process again and request from the server that it should supply a new challenge. The positive integer n of access attempts to the server is preferably limited so as to limit the risk of "brute force" attacks; however, entering a challenge request and then a response request to this challenge preferably does not count as an access attempt and thus does not reduce the number of subsequent authorized access attempts.

The method can advantageously be automatically interrupted following a number m of consecutive requests to have the response displayed by the terminal, m being a positive integer. This makes it possible to prevent a user from trying to guess the algorithm or key necessary for calculating the response to a challenge, based on observing a considerable number of challenge—response pairs. The number m can be predefined or, advantageously, be selected in a random fashion according to Poisson's law.

The invention also relates to a computer system (for example a server 4 or a computer) including means for generating a challenge, means for verifying a response to said challenge and for providing access in case the response is correct, as well as means for remotely transmitting the expected response to said challenge in answer to a user request. These different means are advantageously constituted by computer supports containing portions of computer code that an be executed by a data processing system in order to have it execute the method described here above when this code is executed.

The invention claimed is:

1. Method comprising the following steps:
   a) a user enters an access request in a terminal connected to an authorized server,
   b) a personal cryptographic device of the user calculates and displays a response to a challenge comprising a code,
   c) said response is transmitted to the authorized server by the user via said terminal,
   d) a verification of the response is performed by the authorized server, wherein the user is authenticated only if the entered response is correct,
   wherein the user verifies the operation of the personal cryptographic device by replacing, whenever he desires so, the steps c) and d) by the following steps e) to g) so that the personal cryptographic device does not know whether and when the user might request this verification:
   e) the user requests the terminal to display the expected response to the challenge, this operation interrupts the authentication process;
   f) the terminal displays said information to the user, and cannot modify with impunity the response it displays in response to a challenge, as the user always has the possibility of verifying this response and thus of discovering any tempering,
   g) the user uses said information in order to verify that the code displayed by the personal cryptographic device corresponds only to the expected response to the challenge and that this code has not been modified in order to transmit other confidential information or for another purpose;
   if the response displayed by the device is correct, and if the user whishes to be authenticated and connected to the server,
   the method can be automatically interrupted following a number m of consecutive request to have the response displayed by the terminal, m being a positive integer, to prevent a user from trying to guess the algorithm or key necessary for calculating the response to a challenge based on observing a considerable number of challenge-response pairs.

2. The method of claim 1, wherein the execution of the steps e) to g) does not result in the user being authenticated.

3. The method of claim 2, wherein the steps b) to d) are repeated following the steps e) to g) in order to authenticate the user with a new challenge and a new response.

4. The method of claim 2, wherein said response is a response to a challenge displayed by said terminal following said access request,
   said challenge being then transmitted to said personal cryptographic device,
   wherein said response calculated by the personal cryptographic device depends on said challenge.

5. The method of claim 4, wherein said terminal performs a user identification, wherein said challenge and/or said response depend on said identification.

6. The method of claim 1, wherein said response depends on the current time.

7. The method of claim 1, wherein the terminal displays a new challenge when an incorrect response has been transmitted during step c) and interrupts the authentication method following a number n of consecutive input attempts of incorrect responses, wherein n is a positive integer.

8. The method of claim 1, wherein the method is automatically interrupted following a number of consecutive requests to have the response displayed by the terminal, wherein said number is a positive integer.

9. The method of claim 1, wherein said personal cryptographic device asks the user to authenticate himself/herself with a password or biometric data and refuses to display any said response if the authentication has failed.

* * * * *